United States Patent
Levanon et al.

(10) Patent No.: US 7,561,156 B2
(45) Date of Patent: Jul. 14, 2009

(54) ADAPTIVE QUADTREE-BASED SCALABLE SURFACE RENDERING

(75) Inventors: Isaac Levanon, Rannana (IL); Yonatan Lavi, Rannana (IL)

(73) Assignee: INOVO Limited, Anguilla, British West Indies ( * ) Notice: Subject to any disclaimer, the term of this patent is extended or adjusted under 35 U.S.C. 154(b) by 246 days.

(21) Appl. No.: 11/275,996

(22) Filed: Feb. 8, 2006

(65) Prior Publication Data

US 2007/0182734 A1    Aug. 9, 2007

(51) Int. Cl.
*G06T 15/00* (2006.01)

(52) U.S. Cl. .................. 345/428; 345/423; 345/419

(58) Field of Classification Search .......... 345/428, 345/426–427, 419–420, 423
See application file for complete search history.

(56) References Cited

U.S. PATENT DOCUMENTS

| | | | |
|---|---|---|---|
| 4,694,404 A | 9/1987 | Meagher | 345/421 |
| 4,944,023 A | 7/1990 | Imao | 382/240 |
| 5,345,490 A | 9/1994 | Finnigan | 345/420 |
| 5,461,712 A | 10/1995 | Chelstowski | 345/543 |
| 5,615,321 A | 3/1997 | Corn | 345/619 |
| 5,883,629 A | 3/1999 | Johnson | 345/419 |
| 6,014,671 A | 1/2000 | Castelli | 345/419 |
| 6,075,538 A | 6/2000 | Shu | 345/419 |
| 6,191,797 B1 | 2/2001 | Politis | 345/420 |
| 6,292,190 B1 | 9/2001 | Corn | 345/427 |
| 6,373,489 B1 | 4/2002 | Lu | 345/428 |
| 6,587,103 B1 | 7/2003 | Tucker | 345/421 |
| 6,910,001 B2 | 6/2005 | Hammersley | 345/420 |
| 6,917,369 B2 | 7/2005 | Perry | 345/420 |
| 6,982,715 B2 * | 1/2006 | Isenburg | 345/428 |
| 7,095,423 B2 * | 8/2006 | Cosman et al. | 345/629 |

OTHER PUBLICATIONS

Lee et al., Navigating through Triangle Meshes Implemented as Linear Quadtrees, ACM Transactions on Graphics, vol. 10, No. 2, Apr. 2000, pp. 79-121.*

* cited by examiner

*Primary Examiner*—Phu K Nguyen
(74) *Attorney, Agent, or Firm*—DLA Piper LLP (US)

(57) ABSTRACT

A 3D scalable surface renderer allows efficient real-time 3D rendering of high-detail smooth surfaces. The renderer is exceptionally effective with software rendering and low-end weaker graphics accelerators, and provides excellent visible quality per the amount of polygons used, while retaining low CPU processing overhead and high efficiency on graphics hardware. The 3D scalable surface renderer provides real time rendering of extremely detailed smooth surfaces with view-dependent tessellation using an improved level of detail approach.

18 Claims, 9 Drawing Sheets

ADAPTIVE QUADTREE-BASED SCALABLE SURFACE RENDERING

BACKGROUND OF THE INVENTION

1. Field of the Invention

The present invention relates to computer graphics. In particular the invention relates to real time rendering of extremely detailed smooth surfaces with view-dependent tessellation using an improved level of detail approach. The invention utilizes a quad-tree map and geometric boundaries consisting of manifold non-self-intersecting surfaces.

2. Description of the Related Art

Swift advances in hardware, in particular faster, larger, and cheaper memories, have been transforming revolutionary approaches in computer graphics into reality. One typical example is the revolution of raster graphics that took place in the seventies, when hardware innovations enabled the transition from vector graphics to raster graphics. Another example which has a similar potential is currently shaping up in the field of surface rendering of volumetric bodies. This trend is rooted in the extensive research and development effort in visual graphics in general and in applications using real-time surface visualization, such as video games, terrain imaged interactive road maps and topographical maps for the aerospace industry.

Iso-surfacing algorithms can be classified as either view-dependent or view-independent. View-independent approaches in general generate geometry near the iso-surface. Most methods use triangles to approximate an iso-surface. The use of interval trees and the span space domain decomposition can greatly decrease the amount of work necessary to identify cells intersected by an iso-surface (also called active-cells), a major bottleneck in the extraction process. One advantage of generating geometry is that extraction need not be performed for each view. However, storing geometry becomes a burden as data resolution increases. View-dependent approaches focus on the resulting image and therefore attempt to perform computation mainly in regions that contribute substantially to the final image. View-dependent approaches are attractive in general as no intermediate form of the iso-surface needs to be stored explicitly, which greatly decreases storage requirements. One drawback of view-dependent approaches is that each time a new view is specified; the iso-surface extraction process must be repeated. For interactive applications, where viewing parameters are being changed frequently, such methods perform a relatively large number of computations. View-dependent approaches often offer excellent image quality, but frequently no geometric representation of the iso-surface is generated, making them undesirable for use in geometric modeling applications, for example. Dual contouring methods were introduced to preserve sharp features and to alleviate storage requirements by reducing triangle count.

Conventionally, a hierarchical data structure for describing an image, which is made up of a plurality of kinds of regions A, B, C, D and E, consists of a four or eight branch tree structure (so-called quad-trees and oct-trees). According to this system, the image is equally divided (decomposed) into four regions, and each region is recursively and equally subdivided (decomposed) into four sub regions until each sub region is made up solely of a single kind of region. The image data storage efficiency of this method is satisfactory, and the method enables basic image processing in the data structure. In addition, the image can be described in levels of rough steps to fine steps. However, there is a problem in that the number of nodes increases especially at boundary portions of the data structure. In the four-branch tree structure, three nodes and a leaf branch out from a root node. The node is indicated by a circular mark and corresponds to the region or sub region made up of two or more kinds of regions. On the other hand, the leaf is indicated by a black circular mark and corresponds to the region or sub region made up solely of a single kind of region.

Frequently, objects (such as, for example, characters in a video game or terrain in a virtual roadmap) are generated using a so-called "base mesh" composed of a minimum number of large polygons, and so provides a minimum level of rendering detail. The polygons forming the base mesh are normally referred to as "primitives". These primitives are normally selected to enable the position and orientation of the object within a scene to be rapidly (and unambiguously) defined, and thereby facilitate appropriate scaling and animation of the object.

The process of defining polygons within a primitive is referred to as "tessellation", and the number of polygons defined within a primitive is given by the "tessellation rate". Formally, the tessellation rate is the number of segments into which an edge of the primitive is divided by the vertices of the polygons defined within the primitive. Thus, for example, a primitive has (by definition) a tessellation rate of 1. If one or more polygons are then defined within the primitive so one new vertex lies on each edge of the primitive (thereby dividing each edge into two segments), then the tessellation rate will become 2. Similarly, If other polygons are then defined within the primitive such that two vertices lie on each edge of the primitive (thereby dividing each edge into three segments), then the tessellation rate will be 3. As may be appreciated, since the tessellation rate (or value) is based on the number of segments into which an edge of the primitive is divided, the tessellation rate can be defined on a "per-edge" basis. In principle, this means that different edges of a primitive may have the same, or different, tessellation values.

In cases where a higher level of detail is required, additional polygons can be defined within each primitive, as needed.

There are a variety of existing methods that aim at reducing the amount of geometric primitives that are processed by the rendering pipeline proper. One general technique, called occlusion culling, operates by eliminating sections of the geometry that are invisible from the current view port (or from any of its immediate surrounding area or volume). Another technique uses several refinement levels for the geometry. Then the system renders only the crudest representation of geometry that will result in less than a certain acceptable level of visible error when compared against an image rendered from the exact geometry. This approach is known as a "level-of-detail scheme" in the art. The present invention improves on this category, in particular utilizing the quad-tree-based subdivision approach. The present invention has considerably less requirements on the structure of the geometry than state-of-the-art methods based on this approach, yet still benefiting from its simplicity and efficiency. These weaker requirements allow the herein inventive method to use geometric representations that have significantly less geometric primitives than is typical. This means the system will have to render considerably less primitives in real time than is used by methods known in the art to achieve the same level of fidelity. The present invention advantages are especially prevalent when rendering such level of fidelity on limited computing devices in terms of processing power and memory allocation as well as when streaming the geometric primitives over limited bandwidth communication.

SUMMARY OF THE INVENTION

It is therefore an object of this invention to allow efficient real-time 3D rendering of high-detail smooth surfaces. Properly implemented, it is exceptionally effective with software renderers and low-end weaker graphics accelerators, and provides excellent visible quality per the amount of polygons used allowing high efficiency with graphics hardware, while retaining low CPU processing overhead. Additionally, it can be used under very restrictive memory requirements. This is useful for implementation on embedded devices such as, but not limited to, car navigation systems, personal digital assistance devices, email communicators, mobile handsets, cellular, VoIP, WiFi and WiMAX phones, and topographical GPS mapping for the aerospace industry as those are often very limited in available system RAM.

The geometry the present invention renders consists of manifold, non-self-intersecting, surfaces. Each surface S must be the image of a piecewise smooth mapping $G_S:D\rightarrow R^3$, where D denotes the unit square in $R^2$. The present invention renders the surfaces one at a time and there is not much interdependency between them, so hereafter the description will focus mostly on the rendering of a single surface. Note that the underlying assumption is that the complexity of the dataset is in the mapping of $G_s$ themselves, and not that there are many different surfaces to be rendered.

The method does not use the mappings $G_S$ directly. Instead, it uses a pre-computed data structure called a quadtree, computed from $G_S$. The quadtree is a kind of tree data structure in which each node has up to four children nodes. Each node N has a domain in $R^2$ that will be denoted by D(N). The domain of the root node of the tree is the unit square. The domain of the child nodes of an internal node N, as shown in FIG. 1, is given by dividing the domain of N (a square) into four equal squares, taking each of the four quadrants of the domain for each of the node's four children.

Each node N contains a polygonal approximation G(N) to the surface fragment $G_S(D(N))$. The invention is indifferent to the geometric error method used to determine the distance between G(N) and $G_S(D(N))$ and the logic used to decide the error tolerance or the complexity of the polygonal approximations. The complexity of G(N) is less than the complexity of the aggregate geometry of all of its children G(N.child[0 . . . 3]), so that it takes less computational effort to render G(N) rather than render the geometry of all of its children nodes. Hereafter the polygonal approximations G(N) are referred to as the geometry of the node N. Nodes $N_1$, $N_2$ are called adjacent if the boundary of $D(N_1)$ and $D(N_2)$ intersect.

The rendering algorithm renders the surface S by traversing some portion of the quadtree and rendering only the geometry of terminal nodes of the traversal (i.e. leaf nodes, or such nodes that were traversed, but whose children nodes were not). The traversal either terminates at a node or enters all of its children nodes, meaning the aggregate domain of all terminal nodes covers the entire unit square without any overlaps. The traversed portion is determined by several factors, such as visibility, and the visible error of the rendered geometry G(N) compared to $G_S(D(N))$, taking into account the camera and display settings (camera position and orientation, view port, and display resolution).

The geometry of each node must be a manifold mesh that is composed of triangles. Manifold meshes have exactly two faces connected to each interior edge. Each vertex v has a corresponding location v.loc in the domain, though its position in 3D is not necessarily determined by $G_S(v.loc)$. It is also required that all boundary edges form a single closed loop, so that the topology of the mesh is disc-like, where only vertices located on the boundary of the domain connect to any boundary edges, and the areas of all triangles in the domain are non-overlapping, meaning that for any location L in N(D) there is exactly one vertex, or one edge interior, or one triangle interior that contains L. Additionally, each triangle must have at most one boundary edge, and the boundary is divided to four sections that correspond to the four edges of the node's domain. There must be at least one triangle connecting to each boundary section, so there are at least 4 triangles per node. The sections are indexed between 0 and 3 according to the order of enumeration as shown by FIG. 2. The geometry contained in adjacent nodes of equal depth needs to connect properly along the boundary (meaning, the meshes must have identical edges along their shared boundary, so that the union of the two meshes remains a manifold). However, if the depths of the nodes differ, it is required that the deeper node's geometry will connect to all of the vertices that exist in the other node's geometry on their shared boundary section. The algorithm produces modified versions of the shallower tile's boundary geometry, so proper connectivity is retained in all cases. These requirements are illustrated in FIG. 3a and FIG. 3b. If the geometry in each node satisfies all of the above requirements, it is declared fragment-compatible.

DETAILED DESCRIPTION OF THE INVENTION

Figure 9A:
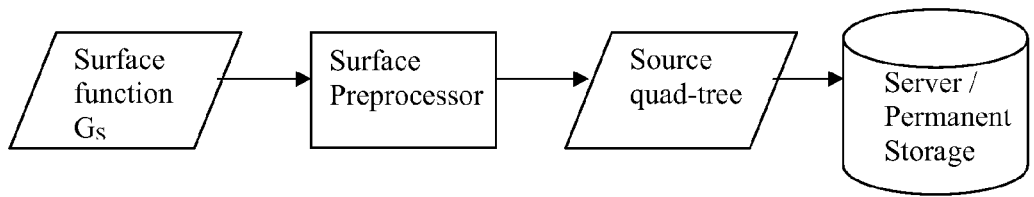
FIG. 9a shows an overview of the preprocessing steps which produces the database used by the real time rendering system as input

The present invention renders surfaces one at a time and there is not much interdependency between them, so hereafter the description will focus mostly on the rendering of a single surface. As shown in FIG. 9a, the complexity of the dataset appears to be in the mapping of $G_s$ of the surface, however, the method does not use the mappings $G_s$ directly. Instead it uses a surface preprocessor and quad-tree structure to create a database from the input surface geometry. This can be stored for later use in any nonvolatile storage.

Figure 9B:
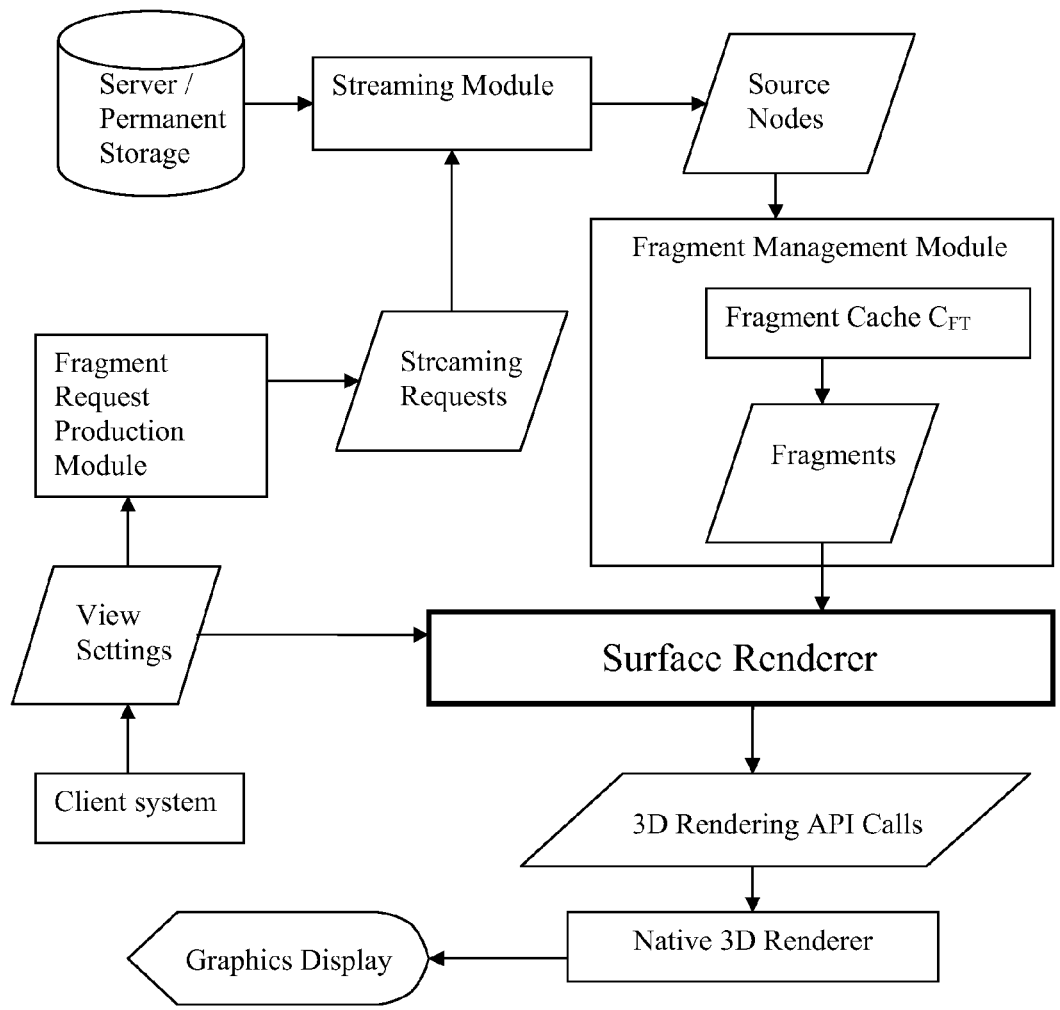
FIG. 9b shows an overview of the components of the real time rendering system

FIG. 9b depicts the run time component of the system where the real time rendering occurs. This is divided into a server side, and a client side. The server side of the system is only required to provide random access output from the database created in the preprocessing step of FIG. 9a. The client side of the run time system of FIG. 9b takes view settings as input. These settings may come from any known input source including a user, a program, hardware and/or a database. The client side of the run time system then produces a sequence of 3D rendering operations that, when applied by the 3D rendering subsystem of the client side, displays an approximation to the appearance of the original surface geometry as seen based on the specified view settings.

Figure 7:
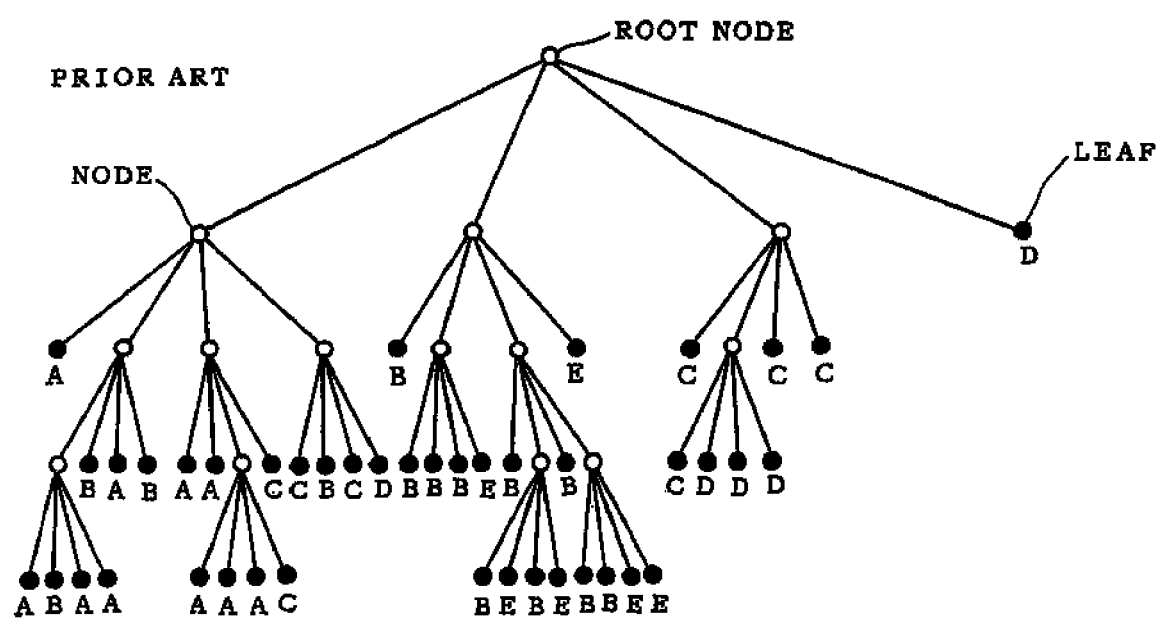
FIG. 7 shows a quad-tree data structure with nodes and leafs
Figure 8:
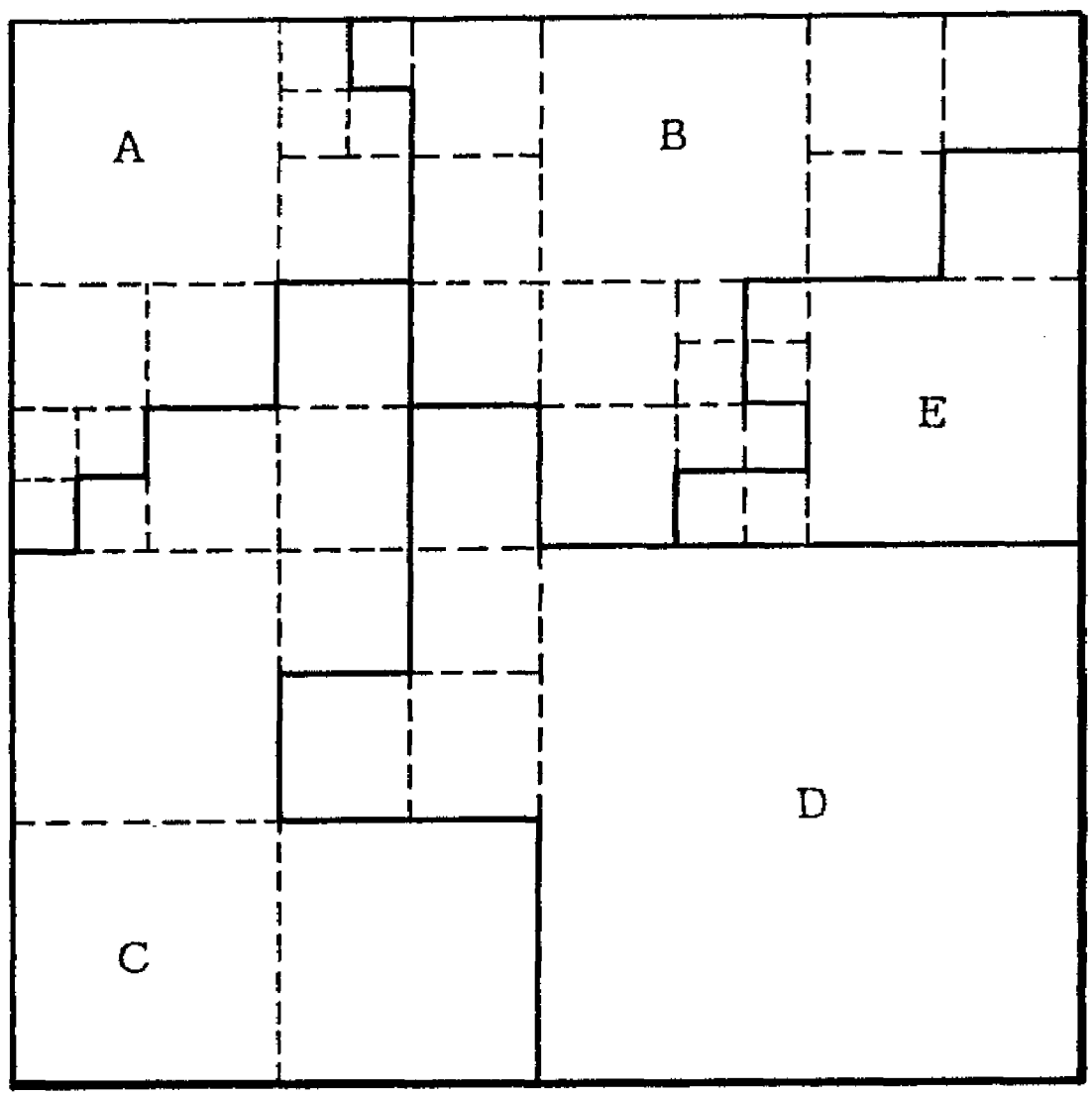
FIG. 8 shows the subdivision of a node on a quad-tree data-structure

During the preprocessing of the surface function $G_s$ a quad-tree data structure is used. A quad-tree is a tree data structure in which each internal node has up to four children see FIG. 7. Quad-trees are most often used to partition a two dimensional space by recursively subdividing it into four quadrants, see FIG. 8. Some common uses of quad-trees are image representation, spatial indexing, efficient collision detection in two dimensions, view frustum culling of terrain data, and storing sparse data, such as formatting information for a spreadsheet. Quad-trees are the two-dimensional analog of octrees. As shown in FIG. 7, a point region (PR) quad-tree is a type of quad-tree where each node (open circle) must have exactly four children, or leaf (darkened circles), having no children. The PR quad-tree represents a collection of data points in two dimensions by decomposing the region containing the data points into four equal quadrants, sub-quadrants, and so on until no leaf node contains more than a single point.

Figure 1:
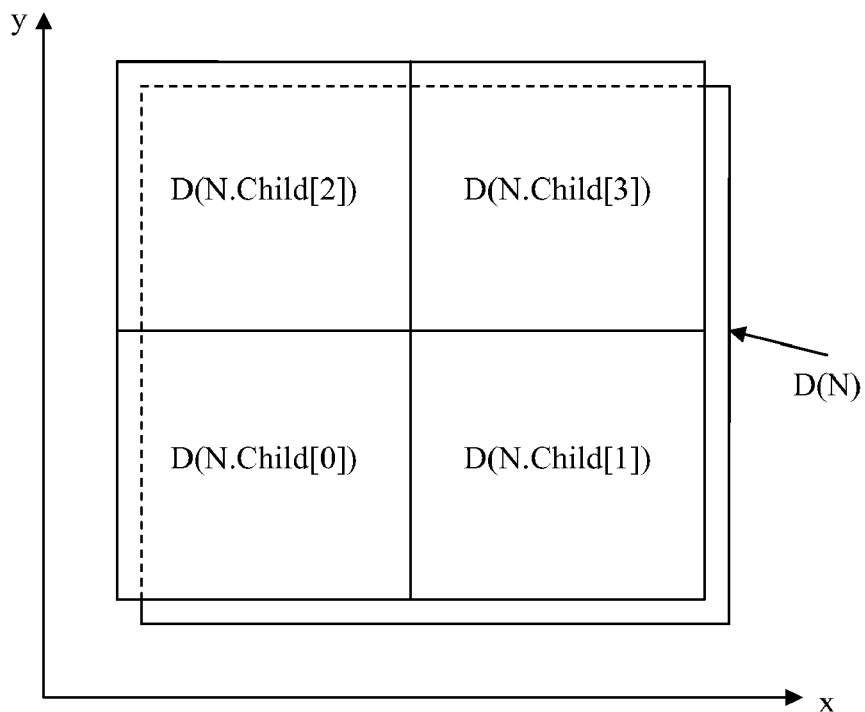
FIG. 1 shows the state of the art of a quad-tree division of a domain node into four equal child nodes
Figure 2:
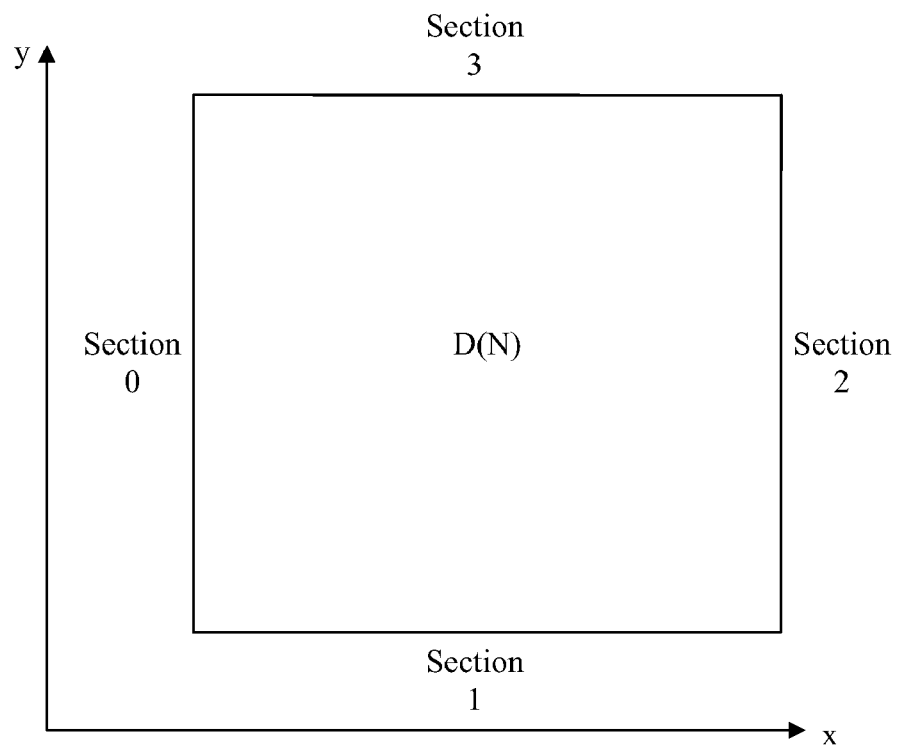
FIG. 2 shows the domain node with adjacent numbered sections where a triangle attaches to each domain node
Figure 3A:
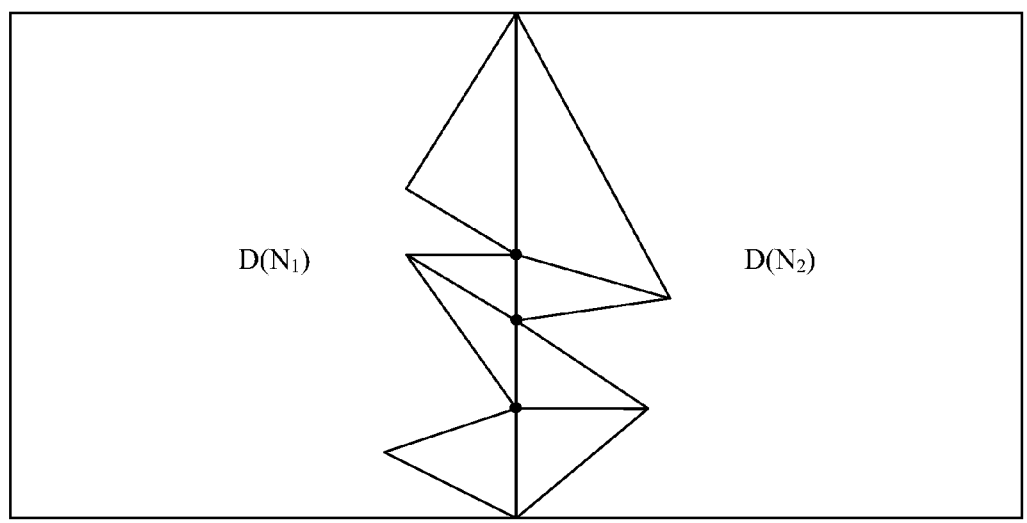
FIG. 3a shows the results of the algorithm producing a modified version of shallower tiles boundary geometry
Figure 3B:
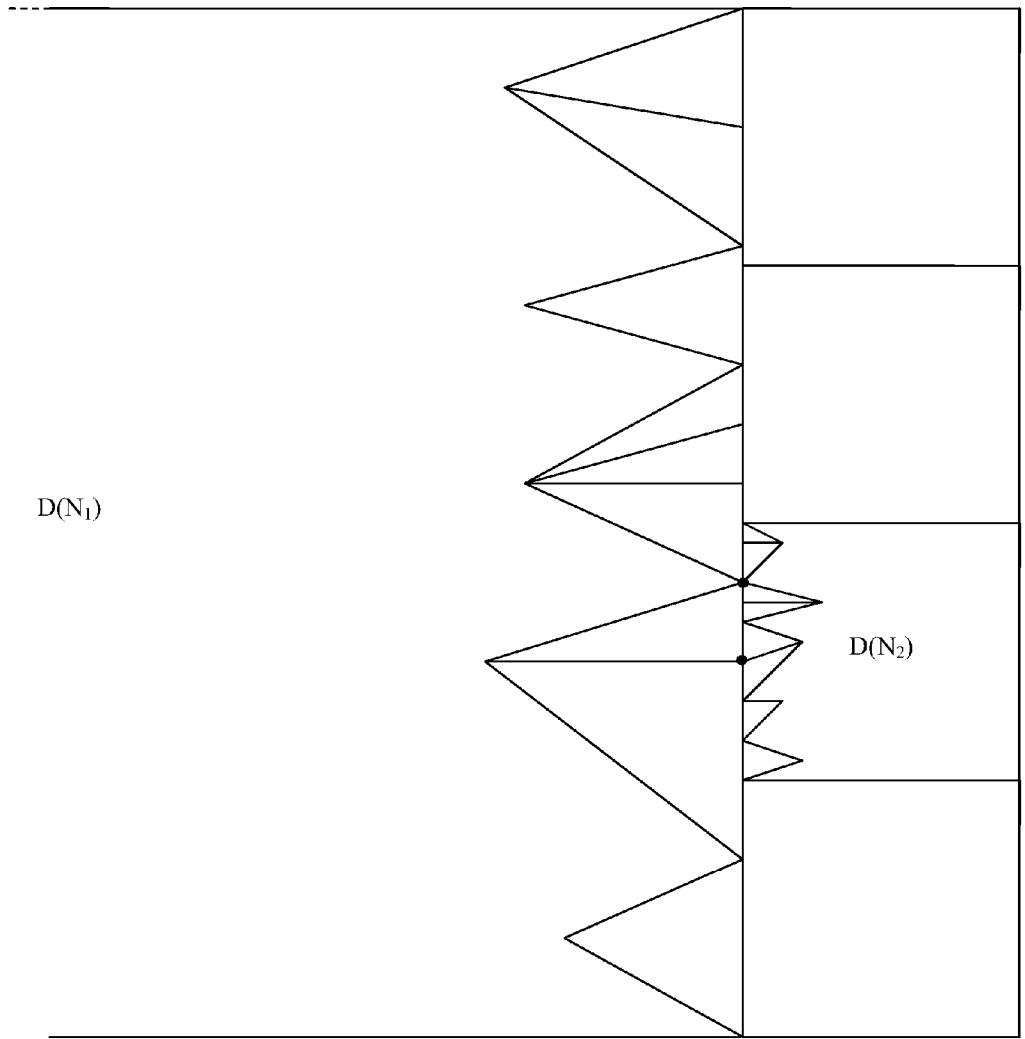
FIG. 3b shows the results of the algorithm producing a modified version of shallower tiles boundary geometry

Each node N has a domain in $R^2$ that will be denoted by D(N) as shown in FIG. 2. The domain of the root node of the tree is the unit square. The domain of the child nodes of an internal node N, as shown in FIG. 1, is given by dividing the domain of N (a square) into four equal squares, taking each of the four quadrants of the domain for each of the node's four children.

Given a node N in a quadtree, its children nodes are identified by numerical indices between 0 and 3, using the notation N.child[x] to refer to the index x child of the node N. N.parent refers to N's parent node in the tree and N.depth is defined as zero for the root node, and as N.parent.depth+1 for any other node. N.xo, N.yo are defined as zero for the root node, and recursively by:

$N.child[x].xo = 2 \cdot N.xo + (x \bmod 2)$ and, $N.child[x].yo = 2 \cdot N.yo + (x \text{ div } 2)$. The domain of $N$ is given by set $[2^{-N.depth} \cdot N.xo, 2^{-N.depth} \cdot (N.xo+1)] \times [2^{-N.depth} \cdot N.yo, 2^{-N.depth} \cdot (N.yo+1)]$.

The real-time system has access to a quad-tree data structure, termed the source quadtree. It contains all data needed to represent the surface, and its nodes are termed source nodes. Note that this structure may be placed in secondary local storage or a remote server, serialized and possibly compressed in some way, arranged so that it is possible to efficiently retrieve only the data belonging to any particular source node. The present invention is agnostic to the encoding of the data and compression methods used. Such data is streamed to memory based on current and predicted demand by the system. The system produces a memory-resident quad-tree structure, termed the fragment tree, whose nodes are named fragments and are constructed using streamed data from the corresponding source nodes. To adhere to memory limitations, the fragments may be placed in a cache denoted by $C_{FT}$. As soon as the amount of cache entries reaches a threshold size $M_{FT}$, any newly created fragment produced replaces the least-recently-used leaf in the tree, which is detached from the quadtree and deleted from memory.

Each source node N contains the following information:

1. A set of vertices $N.v_0, N.v_1, \ldots, N.v_{k-1}$, also denoted by N.verts[0 ... k-1]. Each vertex contains two components: The location of the vertex v inside the node's domain ((x, y) within the unit square), termed v.loc, and its position in 3D world-space (termed v.pos), which usually corresponds to $G_S(v.loc)$. The local index of any vertex $N.v_k$ is defined as k.

2. Five lists of triangles, one for all triangles connecting only to interior edges (termed N.T.int), and one list for each of the four boundary sections, each list containing all triangles that connect to the corresponding section (termed N.T.bd[x], where x is the index of the section). Note that only N.T.int can be empty, so there are at least 4 triangles in total. Typically, triangles are represented as triplets of local indices, so that each triplet (a, b, c) represents the triangle connecting ($N.v_a$, $N.v_b$, $N.v_c$). For any such triangle list T we define T.N to be the node containing T.

3. A real number N.e equal to (or an upper bound of) the maximal value of $\|G_N(x) - G_S(x)\|$ for all x in D(N), where $G_N(X)$ is produced using linear interpolation between the values of v.pos for the vertices of the vertex, edge interior or triangle interior whose domain location contains x. Note that $G_N$ is well-defined, continuous and piecewise linear. Fragment geometry G(N) is usually, but not necessarily constructed with the goal of minimizing N.e and/or the number of triangles used.

All cached fragments keep all of the information loaded from their corresponding source nodes in system memory, and additional information computed by the rendering system. Fragments also store the values N.xo, N.yo and N.depth, as defined above. For convenience, we shall use the same mathematical symbol for fragments and their corresponding source nodes.

The real time surface renderer (denoted by SR) is given information about camera positioning, orientation, field-of-view angles, frustum clipping settings and other related variables, collectively referred to as the current view settings, denoted by SR.VS. Also, it has a visibility testing component annotated as SR.Vis. This is a predicate that takes as arguments view settings (such as SR.VS) and a fragment to test, and must return FALSE only if the fragment's geometry is entirely invisible from the given view settings, and TRUE otherwise. Note that false positives are allowed: it is acceptable that in some cases this test will return TRUE even for fragments that are in fact invisible. The renderer does not depend upon this component for Hidden Surface Removal. SR.Vis(VS, N) can return FALSE if G(N) is entirely outside the field of view (also known as the viewing frustrum). Because false positives are allowed, the system can test a simpler 3D object whose volume contains G(N), such as a box, instead of G(N) itself, against the viewing frustrum, which reduces the computational cost of the test significantly. Also, additional visibility testing can be made using occlusion culling algorithms that take geometry of other fragments (or other, unrelated objects that are rendered in addition to the surfaces handled by SR) as occluders. In some cases the aggregate occlusion of all such objects that appear before G(N) is sufficient to determine N as completely invisible. The present invention does not depend on the logic used in SR.Vis and considers it a black box mechanism.

To render a surface, it traverses its fragment tree and produces a set of fragments $SR.FS = \{N_1, \ldots, N_k\}$ that are to be rendered in the current frame. All of these fragments are terminal nodes of the traversal, though they are not necessarily leaves in the fragment tree, and all fragments determined to be entirely invisible from the current view (by the component SR.Vis) are not inserted to the set. The traversal is done recursively using a function SR.Scan that takes an argument fragment. Initially, it is invoked with the quadtree's root fragment, and SR.FS is assigned the empty set. SR.Scan terminates at any given fragment N unless the following conditions are met:

1. N is not determined to be certainly invisible from the current view, that is, SR.Vis(SR.VS, N) returns TRUE.

2. All of N's four children fragments are valid and are connected to the quadtree structure. This condition is met as soon as the production of these fragments from source node data completes, and will cease to hold as soon as any such child is removed from the fragment cache $C_{FT}$.

3. At least one of the following conditions is met:

a. The visible error of the fragment's geometry G(N) in respect to $G_S(D(N))$ from the current view is greater than the global constant SR.maxGE. The visible error N.ve is usually measured as the maximal distance $\|P(W(G_N(x)))-P(W(G_S(x)))\|$ for all x in D(N), where W maps positions in the 3D environment (world coordinates) to viewer-local coordinates (view coordinates) and P is the projection transform used to map view coordinates to the plane upon which the geometry is logically rendered. Coordinates on this plane correspond to position on the display surface linearly. N.ve is difficult to measure precisely and is usually approximated or bounded. One such possible approximation for N.ve is $\max(\|P(N.e, 0, z_{min})\|, \|P(0, N.e, z_{min})\|)$, where $z_{min}$ is a lower bound on the value of $W(G_N(x)).z$ for all x in D(N). $Z_{min}$ can be further approximated using min W(v).z for all v in the vertex set of a bounding box B whose volume contains $G_N(x)$. The present invention does not depend in particular upon these methods of approximation for N.ve or $z_{min}$.

b. [Applies for texture-mapped surfaces only]: the minimum mipmapping level across G(N) is negative. This value, denoted by L(N), typically corresponds to min $\log_4 |J(P(W(x))/T(x))|$. T(x) maps x from the domain D(N) to a coordinate in texture space of the texture used to draw the fragment N. T is also scaled so that the coordinates of its image correspond to pixels on the texture being mapped. P(W(x)) is the position on the drawing plane, also scaled so that it the coordinates of its image correspond to pixels in the rendering target surface. Texture sampling filters (such as anisotropic filtering) and other global settings may have an effect on how L(N) should be evaluated. It is usually too computationally expensive to compute L(N) exactly and a lower bound on L(N) is used instead. The present invention does not depend upon the exact details of the computation or approximation of L(N).

If the conditions are met, SR.Scan(N) calls itself recursively on all of N's children nodes.

If SR.Scan(N) terminates for any reason other than (1), N is added to SR.FS.

When the traversal completes, the set SR.FS has been determined.

All members SR.FS are inserted to a queue called the geometry pool SR.GP. Fragments that already queued are moved to the back of the queue. The vertices and triangle lists of the newly inserted fragments are loaded into the Vertex Array (denoted by SR.VA) and Source Index Array (denoted by SR.SIA). These global objects contain vertices and indices loaded from all currently queued fragments. The object SR.VA should preferably be a vertex array structure native to the 3D rendering subsystem. The present invention uses the following functions:

1. Function GetGlobalIndex(fragment N, Integer localIndex) returns Integer: This function returns the global index of any vertex of a fragment N given its local index, assuming it is loaded to SR.SIA.

2. Procedure InsertFragment(fragment N): places the world-space position of all of N's vertices in the Vertex Array. The vertices may be placed in any order. Loads all triangle lists of N (N.T.int and N.T.bd[0 . . . 3]) into SR.SIA. The system uses the GetGlobalindex function to translate the local indices given in any triangle list T of N into indices referring to the corresponding positions in the vertex array, so that triangles are given by triplets of indices into SR.VA. The result of this translation is called the global index list of T, denoted by T.GIL. The total amount of indices in T.GIL is denoted by T.GIL.Size.

3. Function AddVertex(fragment N, vertex v) returns Integer: loads a new vertex, that does not appear in $N.v_{0 \ldots k-1}$, into SR.VA. New vertices are assigned local indices, starting from k, separately by each fragment. Additionally, they are immediately placed in the vertex array SR.VA and thus given a global index. They can only be removed from SR.VA along with N's original vertices by RemoveFragment (see (5)). The function returns the global index of the newly inserted vertex.

4. Function AddTriangleSet(fragment A, fragment B, triangle list T): loads a new triangle list into SR.SIA. The local indices of T refer to A's vertices, and T.N is assigned A, but the set also associated with B, see (4). This function is not called more than once per ordered pair (A, B) since the last call to InsertFragment(A).

5. Function QueryTriangleSet(fragment A, fragment B) returns Triangle list: returns the triangle list T inserted by a previous call to AddTriangleSet(A, B, T), if such exists. Otherwise, it returns nil.

6. Procedure RemoveFragment(fragment N): unloads all vertices ($N.v_{0 \ldots k-1}$ and any vertices loaded afterwards by AddVertex for the fragment N). unloads all triangle lists (N.T.int, N.T.bd[0 . . . 3]) and any triangle list T loaded by AddTriangleSet(N, X, T) or AddTriangleSet(X, N, T) for any fragment X. (in other words, triangle lists inserted by AddTriangleSet in which N is one of the two argument fragments).

The present invention treats these functions as a black box, and no specific implementation is suggested as part of the preferred embodiment.

InsertFragment(N) is executed on all fragments N that have just been entered the queue SR.GP. If SR.GP or SR.SIA exceed some predefined size limit, or SR.VA runs out of memory, the system removes the queue's front fragment N from the queue and then invokes RemoveFragment(N). If N is a fragment currently being rendered, the rendering procedure fails. Recovery is possible if by running the rendering procedure again and replacing all fragments in SR.FS={$N_1, \ldots, N_k$} with their parent fragments in the fragment tree {$N_1$.parent, . . . , $N_k$.parent} immediately after SR.Scan completes. Accounting for duplicates, this should lower the size of the set considerably and allow the system to recover.

The next step is to construct a list of triangle lists that will be rendered. To optimize rendering performance, these triangle lists should be ordered by the texture they are rendered with (applicable for textured surfaces only).The method described by the current invention generates a draw list in which the sets are already sorted by their containing fragments, so assuming each fragment uses only one texture, we can achieve this order simply by sorting the fragments themselves (inside SR.FS) by the texture they each use. The list of triangle lists constructed in this step is called the draw list and is denoted by SR.DL.

The present invention scans SR.FS twice. In the first pass it generates binary trees termed section adjacency trees, for all four sections in each fragment N of SR.FS. The first pass also generates any triangle lists that are needed for rendering and don't yet exist. In the second pass, it generates the draw list.

Figure 4:
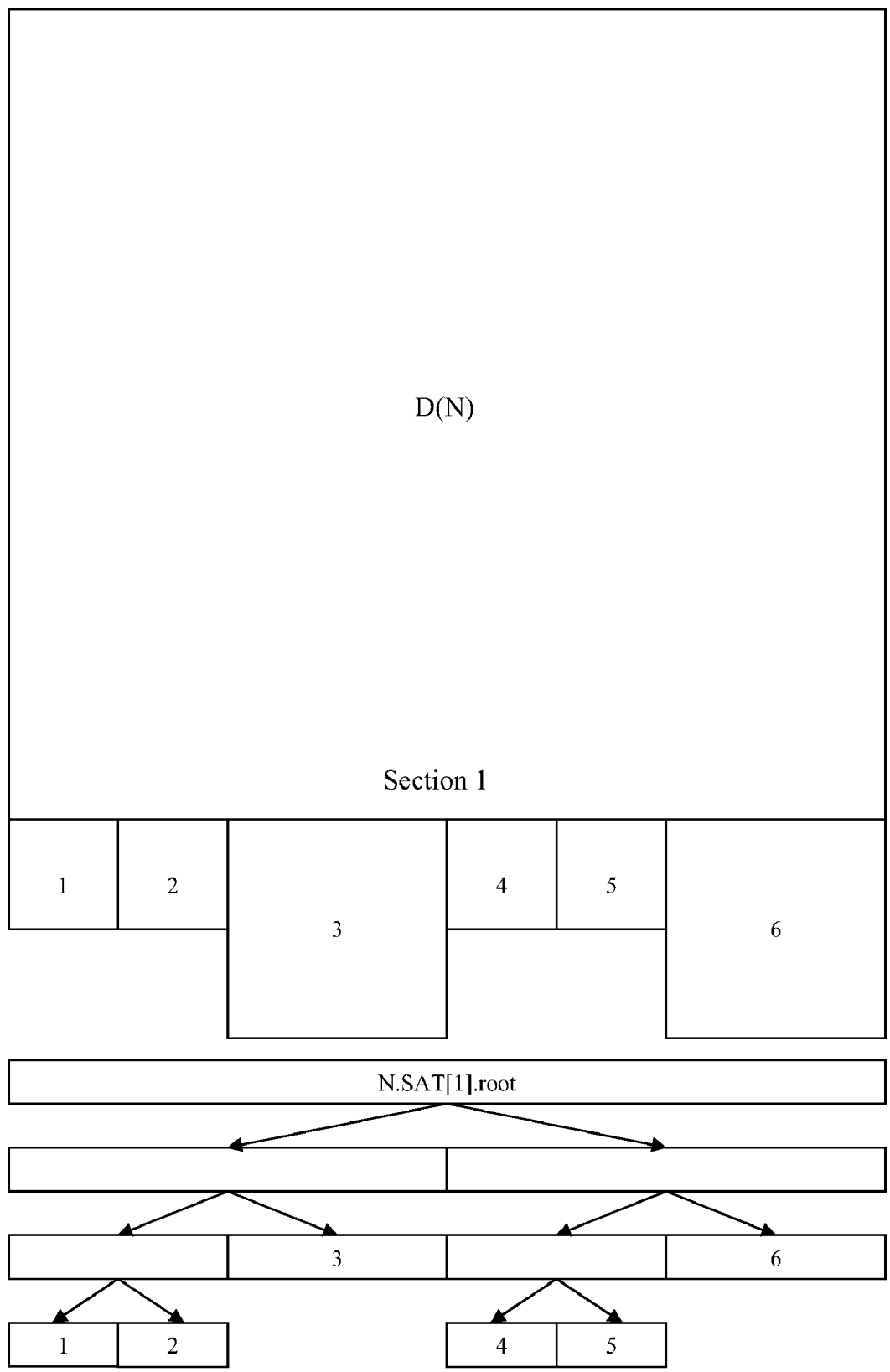
FIG. 4 shows the first pass producing section adjacency trees for all fragments N and sections j so that Z(N, j) contains the set of all fragments that are adjacent to N along section j

The section adjacency trees are denoted by N.SAT[0 . . . 3], so that N.SAT[j] relates to section j. These trees initially consist only of a root, and are all deleted when the surface has been rendered. The leaves of the tree N.SAT[j] represent the connectivity structure needed to correctly attach N to all of its adjacent nodes along section j that appear in SR.FS. Each node of the tree corresponds to a single fragment adjacent to N. For any SAT node S, we will denote that fragment by F(S). F(N.SAT[j].root) is the adjacent node of equal depth across section j (if such exists). The children of each SAT node S correspond to the two children of F(S) that connect that section. The set Z(N, j)={F(S)|S leaf in tree N.SAT[j]} must connect to the entire boundary section j of N, see FIG. 4. The first pass produces section adjacency trees for all fragments N in SR.FS and sections j in 0 . . . 3 so that Z(N, j) contains the set of all fragments in SR.FS that are adjacent to N along section j.

In the first pass, section adjacency trees are produced for all fragments in SR.FS. This is accomplished by an iterative algorithm that inserts each fragment to the adjacency trees of its neighbors on the domain to its appropriate position on each of those trees as defined above.

Figure 5:
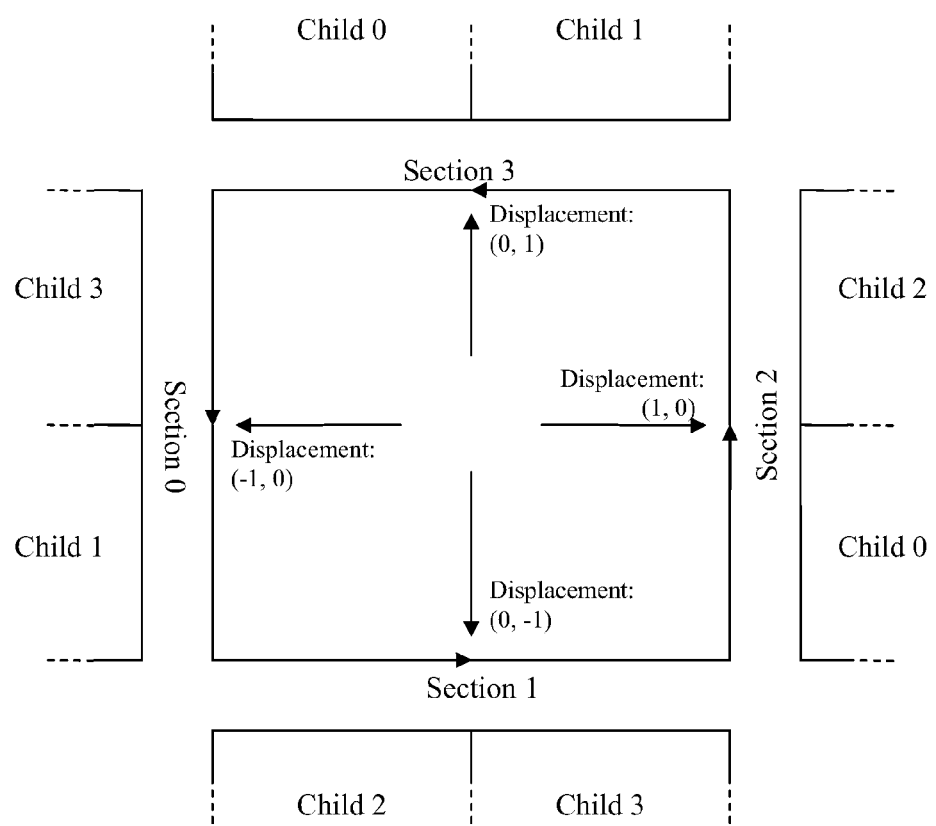
FIG. 5 shows the assignment of the displacement vector constants and the ordering of the adjacent child nodes to a particular section of a domain
Figure 6:
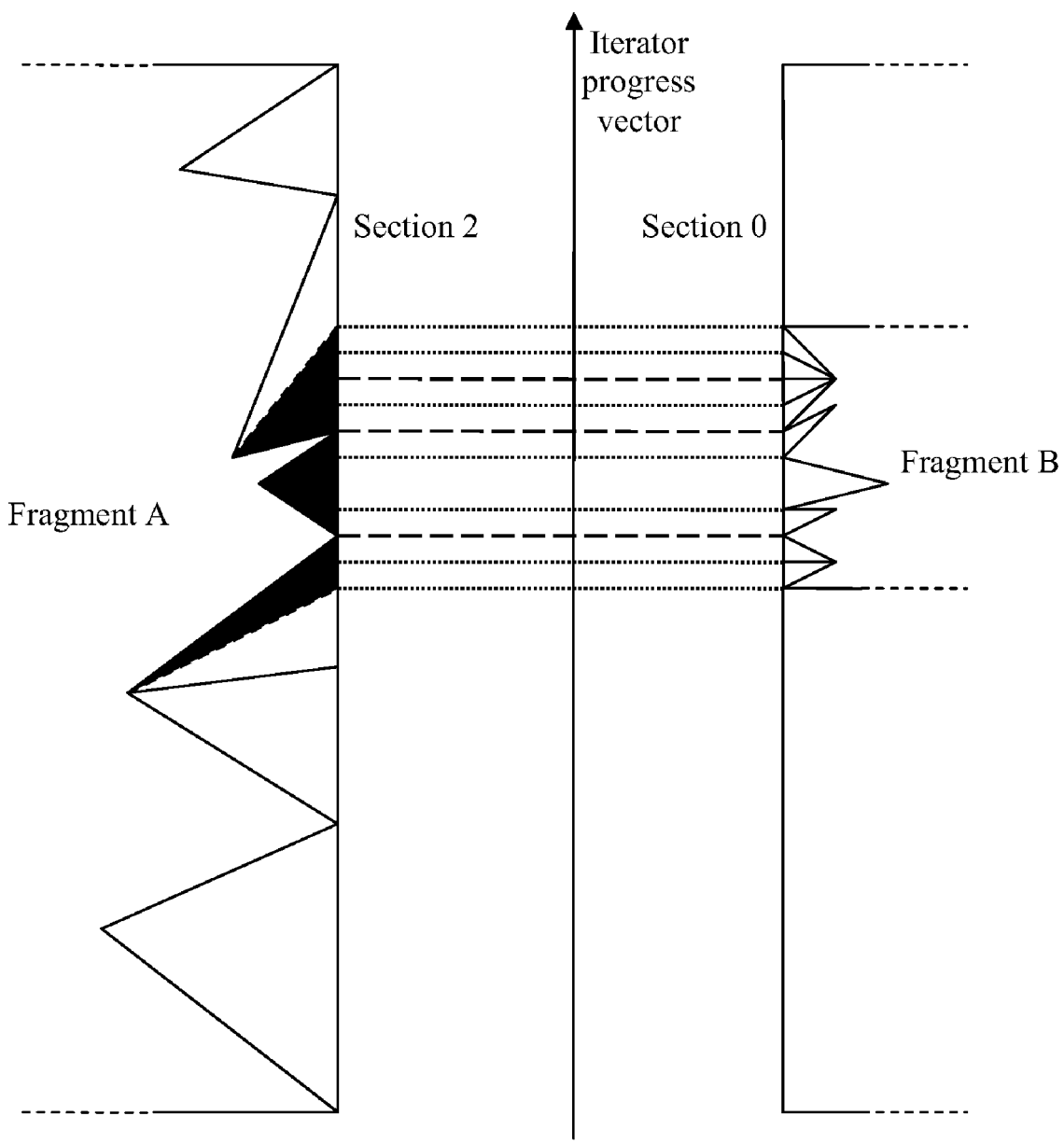
FIG. 6 shows how the vertices of each boundary section are imputed on the adjacent section so that each contains all of the vertices of the next deeper section

Between every two neighboring fragments (A, B) in SR.FS, where A.depth<B.depth, and QueryTriangleSet(A, B) returns nil, the method creates a set of triangles that connect the boundary section shared between A and B, to part of A's interior geometry's boundary on the corresponding section (See FIG. 5). Due to the prerequisite properties of the fragment geometry, it is possible to create these sets by replacing each original triangle in the boundary section with a triangle fan that connects the interior vertex of the original triangle to all boundary vertices of the other fragment (B) lying between the two boundary vertices of the original triangle. Such a triangle set connects between the boundary of fragments A and B with no seams or discontinuities. The result triangle set T is used in the second pass In the second pass, the procedure GenerateDrawList generates the display list SR.DL.

The procedure loops on the fragments found in SR.FS. For each fragment, N, the triangle list N.T.int is inserted to SR.DL. For each section j of N, the procedure examines the section adjacency tree. If it consists only of a root, it inserts N.T.bd[j] to SR.DL. Otherwise, it traverses the section adjacency tree in-order, and keeps track of the fragment M that corresponds to the currently visited node. For each leaf node traversed, it inserts the result of QueryTriangleList(N, M) to SR.DL.

Now that SR.DL has been produced, the system can render the required geometry. First, it copies the global index lists of all the triangle lists in SR.DL into an Index Array (denoted by SR.IA) that is native to the 3D Rendering API. The binary format of the indices should be compatible and so this becomes a simple case of copying blocks of memory.

The surface is then rendered, using the vertex and index arrays, by displaying the global index list of each triangle list with the appropriate texture assigned by its containing fragment. The triangle lists are ordered by the textures they are using, which means only one 3D rendering API call is required per texture.

When rendering multiple surfaces, it is possible to ensure continuity between them if they coincide on some section of the domain of their boundary and have consistent fragment geometry, though this requires a means of reaching the fragment trees of adjacent surfaces, e.g. using a non-directed graph whose vertices consist of references to the surfaces and has an edge for any pair of surfaces that share boundary in this manner. It allows the method to be used to render any 3D object that can be represented by such a graph. For example, a displacement mapped cube can be rendered using six surfaces. In such case each surface shares all four sections of its boundary with other surfaces. More generally, it is possible to use a clustering algorithm to split arbitrary manifold objects to such a surface graph as above, and then use the present invention to render it.

We claim:

1. A 3D scalable surface rendering method having the steps of:
  inputting a surface function, utilizing a surface preprocessor to create a database from said surface function in a storage medium, said database containing a quad-tree data structure, where each node contains a fragment that has one or more manifold triangle meshes,
  accessing said database in said storage medium from a client system utilizing streaming requests, said streaming requests being established according to view setting inputs;
  determining visibility of nodes of said quad-tree using said view setting inputs;
  determining a quad-tree node set used for rendering based on the portion of the quad-tree data structure that has been retrieved and stored in available memory, according to said visibility determination component;
  said surface renderer producing 3D geometry primitives based on said node set; and said 3D geometry primitives rendered on a graphics display.

2. A 3D scalable surface rendering method of claim 1:
  wherein each node contains manifold triangle meshes that satisfy the requirements for fragment-compatibility.

3. A 3D scalable surface rendering method of claim 2:
  wherein the said surface renderer produces triangle meshes connecting between the domain interior triangle mesh of any node in the said node set to the boundary edges of any other nodes in said node set that have greater depth and share a section of boundary in the domain, and produces as output an aggregation of triangle meshes of the node set, chosen so that the visible area of the surface domain is covered with no overlaps or discontinuities.

4. A 3D scalable surface rendering method of claim 3:
  wherein said visible error bounds are determined using the result of a calculation made by the preprocessor for each node of the said quad-tree, said result stored in the database and retrieved by said streaming requests of the surface renderer.

5. A 3D scalable surface rendering method of claim 3:
  wherein said produced triangle meshes are placed in a cache to allow reuse of earlier computations.

6. A 3D scalable surface rendering method of claim 3:
  Wherein the produced triangle meshes are associated with the nodes containing them using section adjacency trees.

7. A 3D scalable surface rendering method of claim 6:
  Wherein the said aggregation of triangle meshes is produced by traversal of the section adjacency trees of the nodes in said node set.

8. A 3D scalable surface rendering method of claim 3:
  Wherein the produced triangle meshes consist of triangle fans, each of said triangle fans connecting all vertices placed on the boundary of the second of said nodes lying between the two boundary vertices of a single triangle of the boundary section trimesh of the first of said nodes with the interior vertex of said triangle.

9. A 3D scalable surface rendering method of claim 1:
wherein determination of said node set is made by recursively traversing said quad-tree structure, according to said node visibility determination and visible geometric error bounds.

10. A 3D scalable surface renderer, comprising:
a server having storage wherein the storage contains a quad-tree data structure having a one or more nodes and each node contains a fragment having one or more manifold triangle meshes;
a graphics display; and
a system having a view setting unit that accepts view setting inputs and a surface renderer unit that accesses the quad-tree data structure using streaming requests, determines visibility of nodes of said quad-tree data structure using said view setting inputs, determines a quad-tree data structure node set used for rendering based on the portion of the quad-tree data structure that has been retrieved and stored based on the visibility determination, and produces 3D geometry primitives based on said quad-tree data structure node set that are displayed on the graphics display.

11. The 3D scalable surface renderer of claim 10, wherein each node contains manifold triangle meshes that satisfy the requirements for fragment-compatibility.

12. The 3D scalable surface renderer of claim 10, wherein the surface renderer unit determines said quad-tree data structure node set is made by recursively traversing said quad-tree data structure according to said node visibility determination and a visible geometric error bounds.

13. The 3D scalable surface renderer of claim 12, wherein the surface renderer unit produces triangle meshes connecting between a domain interior triangle mesh of any node in the said quad-tree data structure node set to the boundary edges of any other nodes in said quad-tree data structure node set that have greater depth and share a section of boundary in the domain and produces an aggregation of triangle meshes of the quad-tree data structure node set as an output based on the visible area of the surface domain that is covered with no overlaps or discontinuities.

14. The 3D scalable surface renderer of claim 13, wherein the surface renderer unit determines the visible geometric error bounds based on a calculation stored in each node of the quad-tree data structure that is retrieved during the streaming requests.

15. The 3D scalable surface renderer of claim 13, wherein the client further comprises a cache wherein the aggregation of triangle meshes are stored in the cache.

16. The 3D scalable surface renderer of claim 13, wherein the surface renderer unit associates the aggregation of triangle meshes with one or more nodes that contain the aggregation of triangle meshes.

17. The 3D scalable surface renderer of claim 13, wherein each triangular mesh further comprises one or more triangle fans, each of said triangle fans connecting all vertices placed on the boundary of the second of said nodes lying between the two boundary vertices of a single triangle of the boundary section tri-mesh of the first of said nodes with the interior vertex of said triangle.

18. The 3D scalable surface renderer of claim 17, wherein the surface renderer unit produces the aggregation of triangle meshes by traversal of the section adjacency trees of the quad-tree data structure nodes in said quad-tree data structure node set.

* * * * *